(12) United States Patent
Berkenes et al.

(10) Patent No.: US 7,524,185 B2
(45) Date of Patent: Apr. 28, 2009

(54) BOOK MOLDING SYSTEM

(75) Inventors: Robert J. Berkenes, Buffalo, MN (US); Tom Roy Skoog, Elk River, MN (US)

(73) Assignee: AMS Research Corporation, Minnetonka, MN (US)

( * ) Notice: Subject to any disclaimer, the term of this patent is extended or adjusted under 35 U.S.C. 154(b) by 168 days.

(21) Appl. No.: 11/687,409

(22) Filed: Mar. 16, 2007

(65) Prior Publication Data

US 2007/0218162 A1 Sep. 20, 2007

Related U.S. Application Data

(60) Provisional application No. 60/783,186, filed on Mar. 16, 2006.

(51) Int. Cl.
*B29C 45/36* (2006.01)

(52) U.S. Cl. .................... 425/577; 425/588; 425/589; 425/595

(58) Field of Classification Search .............. 425/577, 425/588, 589, 595
See application file for complete search history.

(56) References Cited

U.S. PATENT DOCUMENTS 4,969,811 A * 11/1990 Littleton ................. 425/577

* cited by examiner

*Primary Examiner*—James Mackey
(74) *Attorney, Agent, or Firm*—Jose' W. Jimenez; Kimberly K. Baxter; Gregory L. Koeller (57) ABSTRACT

A book molding system including a bottom mold portion, a top mold portion, a core retainer bar and a hinge mechanism. At least one of the bottom mold portion and the top mold portion has a molding recess formed therein. The hinge mechanism pivotally attaches the bottom mold portion, the top mold portion and the core retainer bar so that the core retainer bar is intermediate the bottom mold portion and the top mold portion.

32 Claims, 7 Drawing Sheets

BOOK MOLDING SYSTEM

REFERENCE TO RELATED APPLICATION

This application claims priority to U.S. Applic. No. 60/783,186, filed Mar. 16, 2006, the content of which is incorporated herein by reference.

FIELD OF THE INVENTION

The invention relates generally to a molding system. More particularly, the invention relates to an injection molding system.

BACKGROUND OF THE INVENTION

Injection molding enables plastic parts to be inexpensively produced. Depending on the complexity of the part being fabricated, the mold may include a bottom mold portion, a top mold portion and at least one insert that is placed between the bottom mold portion and the top mold portion.

One of the challenges associated with precisely fabricating parts using injection molding is that the bottom mold portion, the top mold portion and the insert must be accurately aligned.

SUMMARY OF THE INVENTION

The invention is a book molding system including a bottom mold portion, a top mold portion, a core retainer bar and a hinge mechanism. At least one of the bottom mold portion and the top mold portion has a molding recess formed therein. The hinge mechanism pivotally attaches the bottom mold portion, the top mold portion and the core retainer bar so that the core retainer bar is intermediate the bottom mold portion and the top mold portion.

DETAILED DESCRIPTION OF THE PREFERRED EMBODIMENTS

An embodiment of the invention is directed to a book molding system, as illustrated at 10 in the figures. The book molding system 10 may be used to injection mold at least one piece having a variety of shapes and sizes. The book molding system 10 is particularly suited for use in injection molding a plurality of silicone pieces having a relatively small size and a relatively intricate shape.

The book molding system 10 generally includes a bottom mold portion 20, a top mold portion 22, a core retainer bar 24, a distribution plate 26 and a hinge mechanism 28, as most clearly illustrated in FIGS. 1-6. The bottom mold portion 20 and the top mold portion 22 are pivotally mounted to each other using the hinge mechanism 28 for movement between a closed configuration and an open configuration.

When in the closed configuration, material being molded such as silicone can be injected into the book molding system 10 to mold at least one piece in the book molding system 10. When in the open configuration, the at least one piece may be removed from the book molding system 10.

Pivotally mounting the bottom mold portion 20 and the top mold portion 22 enables the bottom mold portion 20 and the top mold portion 22 to be accurately positioned with respect to each other. This configuration thereby increases the accuracy of parts that are manufactured using the book molding system 10.

The bottom mold portion 20 and the top mold portion 22 may each have a similar shape. In one configuration, the bottom mold portion 20 and the top mold portion 22 each have a generally square configuration. The bottom mold portion 20 and the top mold portion 22 may each have a length and a width of between about 12 inches and 36 inches depending on the size and number of pieces that are being molded. In one configuration, the length and width of the bottom mold portion 20 and the top mold portion 22 are between about 12 inches and 18 inches.

Figure 7:
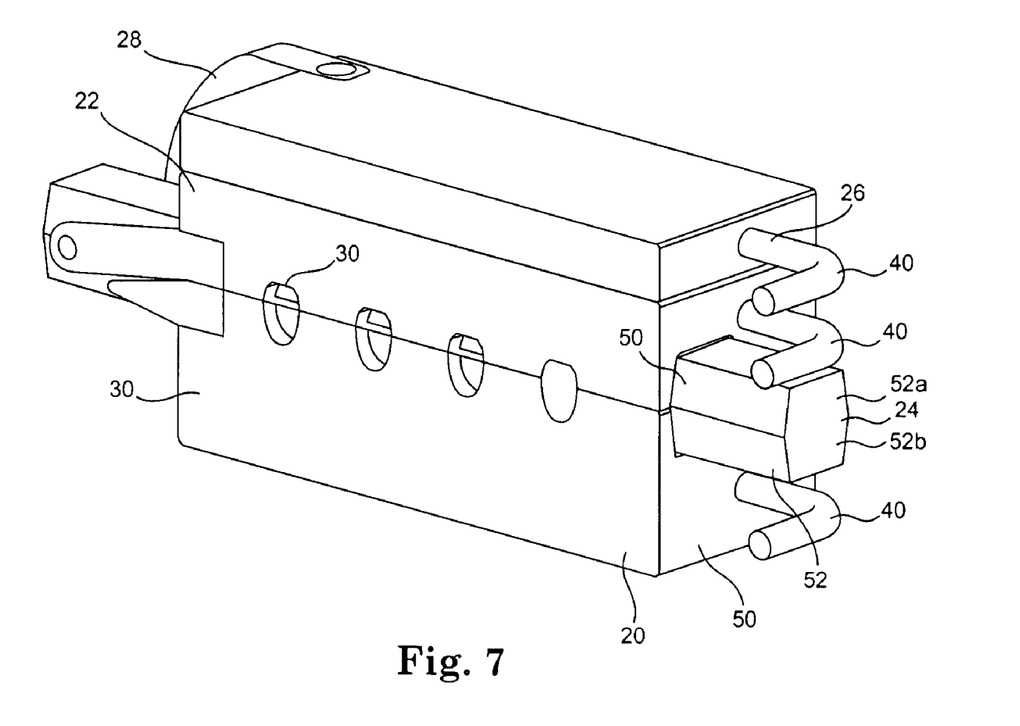
FIG. 7 is a sectional view of the book molding system taken along a line 7-7 in FIG. 1.

The bottom mold portion 20 and the top mold portion 22 may each include a plurality of recesses 30 formed therein, as most clearly illustrated in FIG. 7. The recesses 30 are shaped to produce parts having a desired shape and size.

To facilitate moving the bottom mold portion 20 and the top mold portion 22 between the open configuration and the closed configuration, the bottom mold portion 20 and the top mold portion 22 may each have a handle 40 attached thereto. The handle 40 also facilitates placing the book molding system 10 into the press (not shown).

Figure 8:
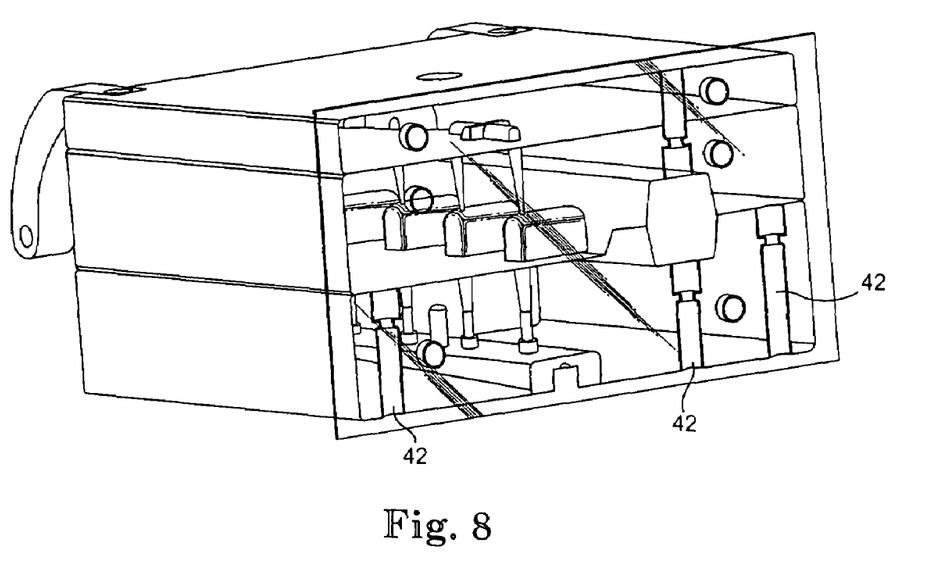
FIG. 8 is a sectional view of the book molding system taken along a line 8-8 in FIG. 1.

A cushion system 42 may also be incorporated into the book molding system 10 to reduce the potential of damage to the bottom mold portion 20 and the top mold portion 22 as these components are moved to the closed configuration, as most clearly illustrated in FIG. 8. The cushion system 42 may be positioned proximate to the corners of the bottom mold portion 20. The cushion system 42 may also be positioned in the bottom mold portion 20 and the top mold portion 22 above and below the core retainer bar 24. The cushion system 42 may also be provided between the top mold portion 22 and the distribution plate 26.

The cushion system 42 may be at least partially recessed in at least one of the bottom mold portion 20 and the top mold portion 22. In one configuration, the cushion system 40 includes a top cap 44 and a resilient mechanism 46, as most clearly illustrated in FIG. 9. In addition to exhibiting resilient characteristics, the resilient mechanism 46 needs to withstand the temperatures that are utilized during the molding process without experiencing degradation. In one configuration, the resilient mechanism 46 is a plurality of washers 48. Each of the washers 48 has a curved configuration such that at least one area of the washer 48 has a height that is raised.

Figure 9:
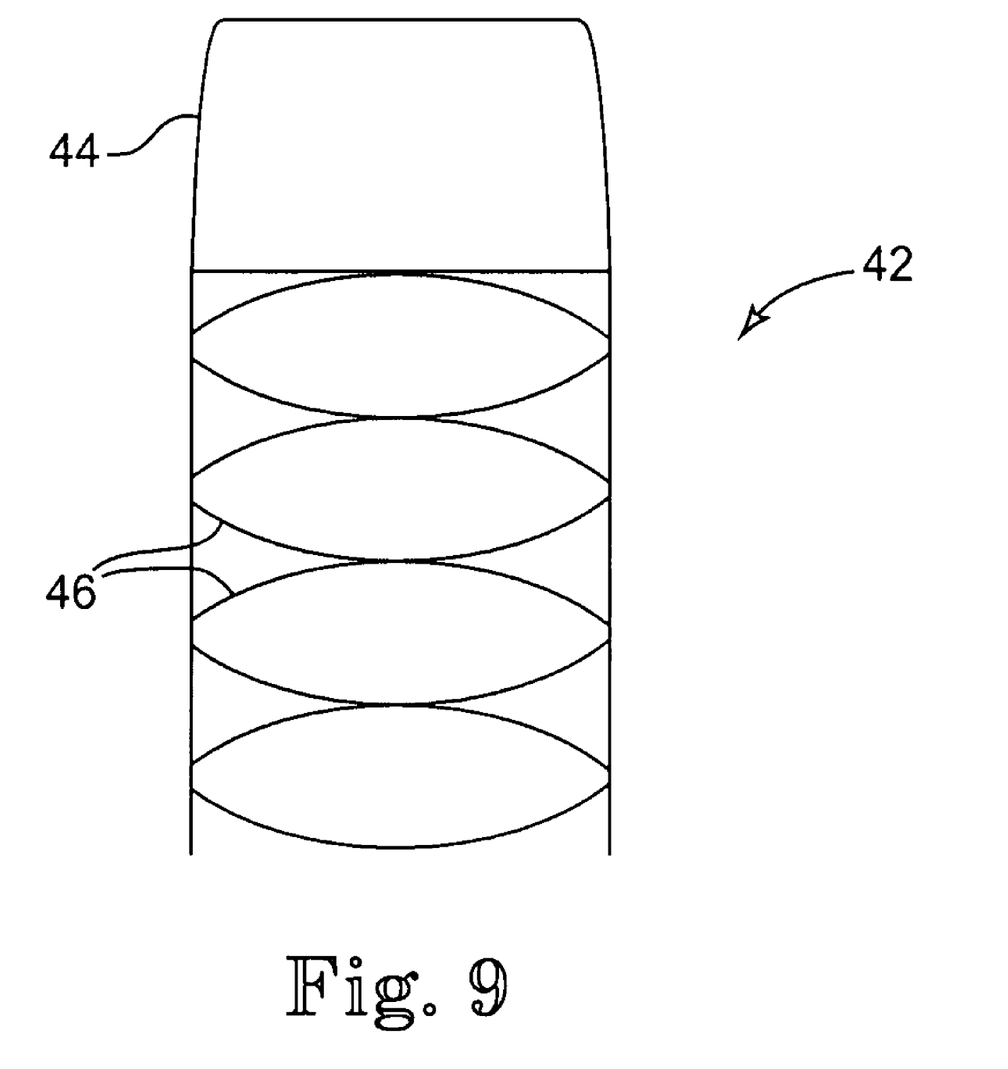
FIG. 9 is a side view of a cushion system.

The washers 48 may be fabricated from a resilient metallic material that deforms to reduce the height of the cushion system 42 in response to a force placed on the top cap 44 from the top mold portion 22 moving to approximately the closed configuration to thereby prevent damage to the bottom mold portion 20 and the top mold portion 22 as the book molding system 10 approaches the closed configuration.

Figure 10:
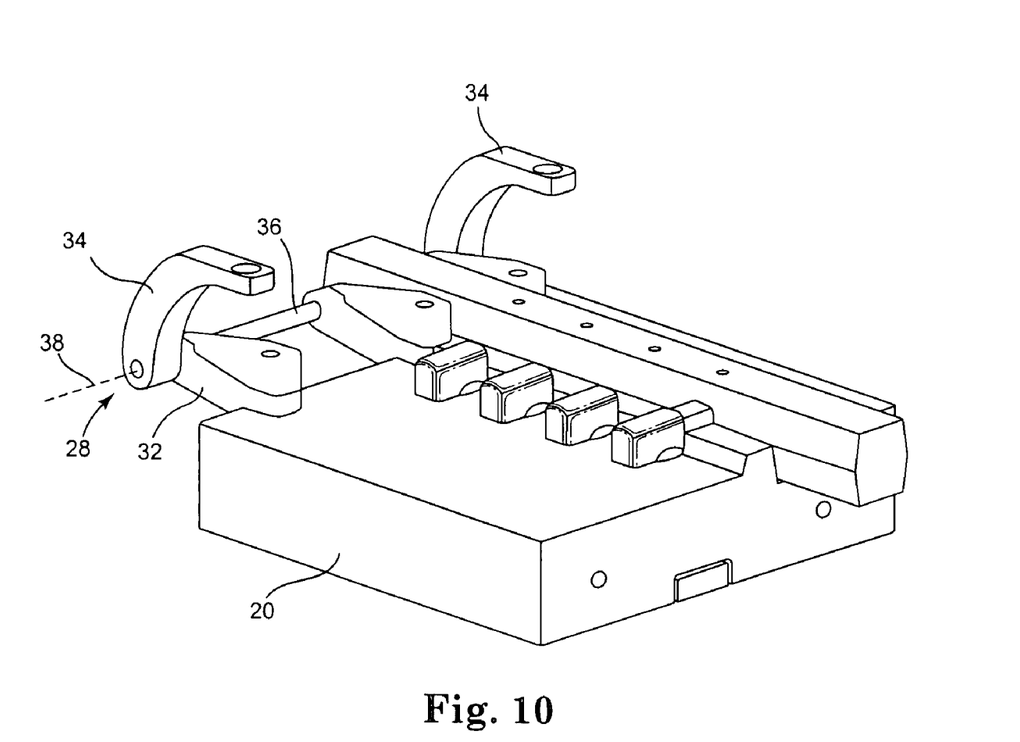
FIG. 10 is a perspective view of the book molding system with a top mold portion and a distribution plate removed therefrom.

The hinge mechanism 28 generally includes a lower hinge leaf 32 and an upper hinge leaf 34 that are pivotally attached to each other using a pivot pin 36, as most clearly illustrated in FIG. 10. The lower hinge leaf 32 is attached to the bottom mold portion 20 and the upper hinge leaf 34 is attached to the top mold portion 22. The lower hinge leaf 32 may be removably attached to the bottom hinge plate 20 such as using a bolt (not shown). Alternatively, the lower hinge leaf 32 may be integrally fabricated to the bottom mold portion 20. Similarly, the upper hinge leaf 34 may be removably attached or integrally fabricated to the upper mold portion 22.

In one configuration, there are three lower hinge leafs 32 attached to the bottom mold portion 20 and three upper hinge leafs 34 attached to the top mold portion 22. Using this configuration provides support along a length of the pivot pin 36 to reduce the potential of the pivot pin 36 bending when forces are placed on the pivot pin 36 such as when attempting to separate the core retainer bar 26 from the bottom mold portion 20 after pieces are molded.

The pivot pin 36 defines a pivot axis 38 about which the lower hinge leaf 32 and the upper hinge leaf 34 are pivotable. The pivot axis 38 is offset from a back edge of the bottom mold portion 20 and the top mold portion 22 such that the bottom mold portion 20 and the top mold portion 22 are moving generally parallel to each other when the book molding system 10 is approaching the closed configuration.

Forming the book molding system 10 with this configuration enhances the ability to accurately position with the bottom mold portion 20 with respect to the top mold portion 22 without angling the areas of the bottom mold portion 20 and the top mold portion 22 to account for the radius of movement.

In one embodiment, the pivot point 38 is offset from the back edge of the bottom mold portion 20 and the top mold portion 22 by at least one inch. In another configuration, the pivot point 38 may be offset from the back edge of bottom mold portion 20 and the top mold portion 22 between about 1.5 inches and 3 inches.

The core retainer bar 24 is positioned between the bottom mold portion 20 and the top mold portion 22, as most clearly illustrated in FIGS. 7-8. Using the core retainer bar 24 in conjunction with the bottom mold portion 20 and the top mold portion 22 enhances the details and shapes that can be formed on the pieces produced using the book molding system 10. The core retainer bar 24 at least partially seats in a recess 50 formed in at least one of the bottom mold portion 20 and the top mold portion 22.

To enhance the ability to accurately position the core retainer bar 24 in the book molding system 10, sides 52 of the core retainer bar 24 may be oriented at an angle. Forming the sides 52 of the core retainer bar 24 with the angle also facilitates locking the core retainer bar 24 in a fixed position in the book molding system 10.

In configurations where the core retainer bar 24 is recessed in both the bottom mold portion 20 and the top mold portion 22, the sides 52 each include an upper side portion 52*a* and a lower side portion 52*b* that are each oriented at an angle.

In one configuration, the sides 52 of the core retainer bar 24 are oriented at an obtuse angle. In another configuration, the sides 52 may be oriented at an angle of between about 95 and 110 degrees. In still another configuration, the sides 52 may be oriented at an angle of about 100 degrees. Sides 54 of the recess 50 may be also be oriented at an angle to be generally aligned with sides 52 of the core retainer bar 24.

When the core retainer bar 24 is placed between the bottom mold portion 20 and the top mold portion 22, the core retainer bar 24 may extend beyond a front surface of the bottom mold portion 20 and the top mold portion 22. This configuration enables the end of the core retainer bar 24 to be lifted to separate the core retainer bar 24 from the bottom mold portion 20.

Figure 1:
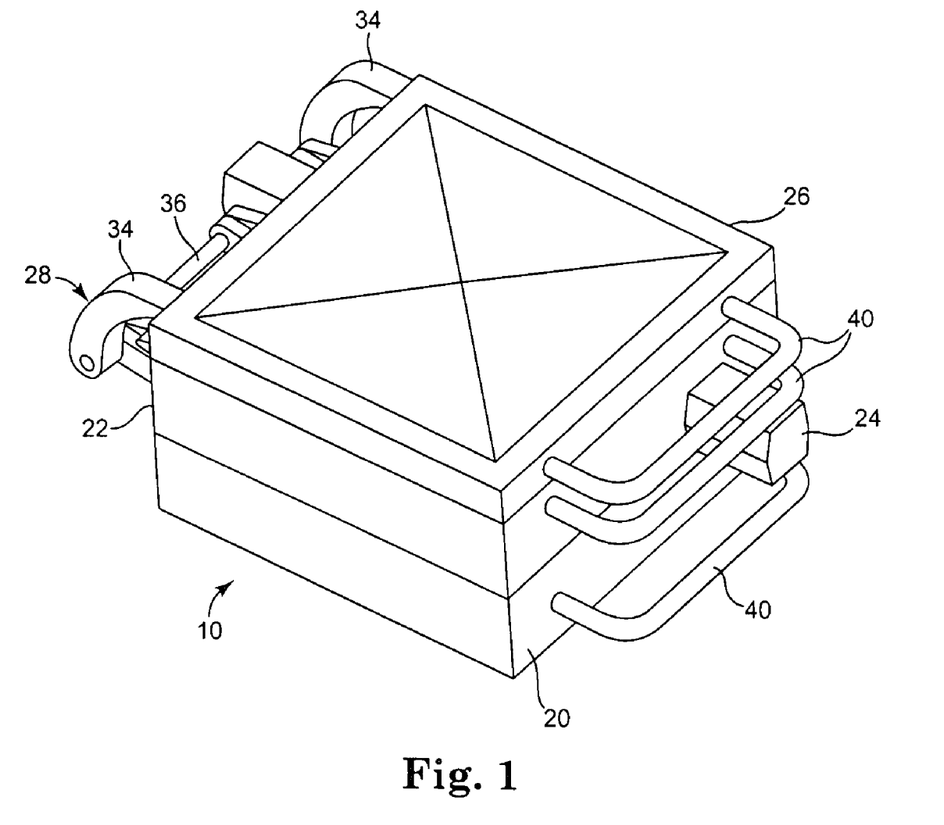
FIG. 1 is a perspective view of a book molding system according to an embodiment of the invention.
Figure 2:
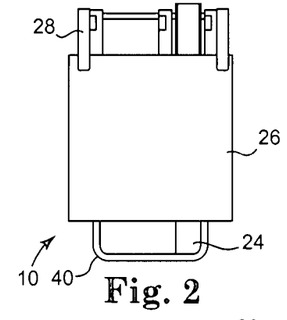
FIG. 2 is a top view of the book molding system.
Figure 3:
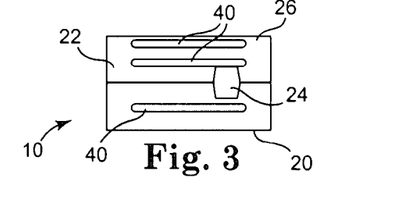
FIG. 3 is a front view of the book molding system.
Figure 4:
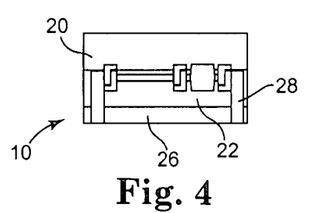
FIG. 4 is a back view of the book molding system.
Figure 5:
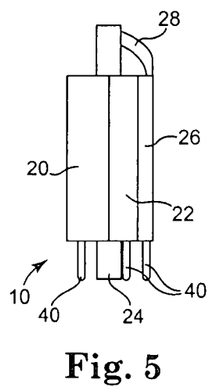
FIG. 5 is a first side view of the book molding system.
Figure 6:
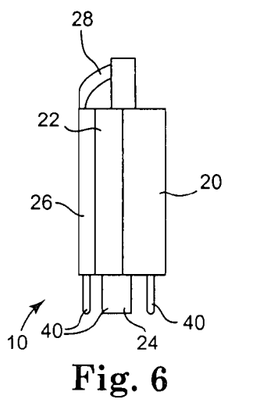
FIG. 6 is a second side view of the book molding system.

The core retainer bar 24 may be pivotally mounted to the hinge mechanism 28 to further enhance the accuracy of placing the core retainer bar 24, as illustrated in FIGS. 1-2. Additionally, pivotally mounting the core retainer bar 24 in the book molding system 10 enhances the ability to separate the core retainer bar 24 from the bottom mold portion 20 because a person operating the book molding system 10 may grasp the handle 40 on the bottom mold portion 20 with a first hand and the core retainer bar 24 with a second hand.

Figure 11:
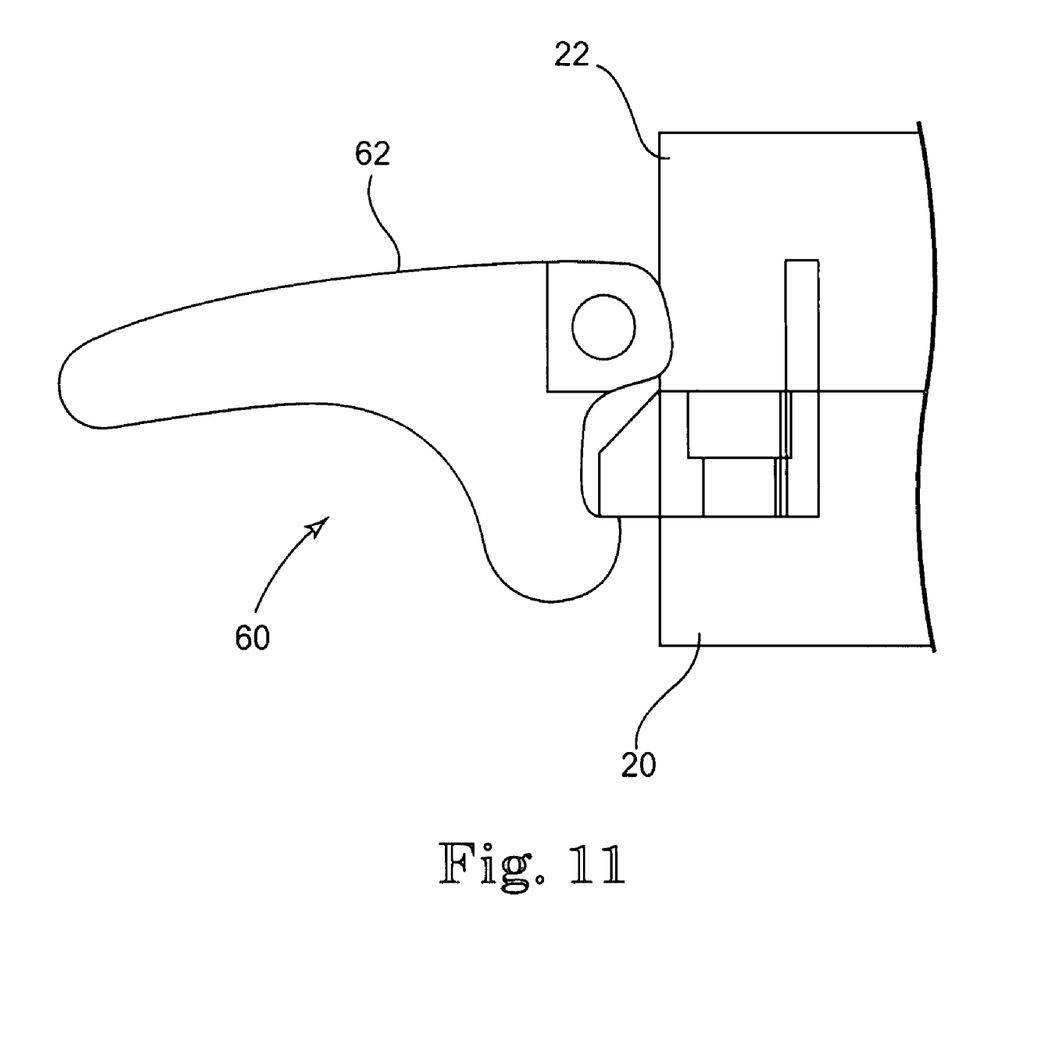
FIG. 11 is a side view of the locking mechanism.

A locking mechanism 60 may be provided on the book molding system 10, as illustrated in FIG. 11, to maintain the top mold portion 22 in a closed position with respect to the bottom mold portion 20 when the book molding system 10 is removed from an injection molding press (not shown). The locking mechanism 60 may include a locking arm 62 that is pivotally mounted to the bottom mold portion 20. The locking arm 62 is biased to a locking position.

When in the locking position, the locking arm 62 engages the bottom mold portion 20 and thereby retains the top mold portion 22 in a closed position with respect to the bottom mold portion 20 to thereby prevent damage to the pieces fabricated in the book molding system 10 when the book molding system 10 is removed from the injection molding press.

The distribution plate 26 may be used with the book molding system to enhance the delivery of the material being molded to the recesses 30 in the bottom mold portion 20 and the top mold portion 22. The distribution plate 26 has at least one channel formed therein that facilitates delivering the material being molded to various apertures in the top mold portion 22. The distribution plate 26 may also be pivotally attached in the book molding system 10 using the hinge mechanism 28.

In operation, the core retainer bar 24, the top mold portion 22 and the distribution plate 28 are each pivoted towards the bottom mold portion 20 using the hinge mechanism 28. As the core retainer bar 24 and the top mold portion 22 are pivoted towards the bottom mold portion 20, the angled sides 52, 54 retain the core retainer bar 24 in a stationary position with respect to the bottom mold portion 20 and the top mold portion 22. Additionally, as the core retainer bar 24 and the top mold portion 22 are pivoted towards the bottom mold portion 20, the cushion system 42 prevents the components from striking each other.

The book molding system 10 is placed in a press and material being molded is delivered through the distribution plate 28 and into the bottom mold portion 20 and the top mold portion 22 to substantially fill the recesses 30.

Pressure exerted by the press is discontinued, as prelude to removing the book molding system 10 from the press. The locking mechanism 60 retains the top mold portion 22 in a closed position with respect to the bottom mold portion 20 to thereby prevent damage to the molded pieces caused the top mold portion 22 pivoting away from the bottom mold portion 20 as the press is released.

The locking arm 62 is pivot to enable the top mold portion 22 to pivot away from the bottom mold portion 20 using the handle 40. The core retainer bar 26 is then pivoted away from the bottom mold portion 20 and pieces molded in the book molding system 10 may be removed.

It is contemplated that features disclosed in this application, as well as those described in the above applications incorporated by reference, can be mixed and matched to suit particular circumstances. Various other modifications and changes will be apparent to those of ordinary skill.

The invention claimed is:

1. A book molding system comprising:
   a bottom mold portion;
   a top mold portion, wherein at least one of the bottom mold portion and the top mold portion having a molding recess formed therein;
   a core retainer bar; and
   a hinge mechanism pivotally attaching the bottom mold portion, the top mold portion and the core retainer bar so that the core retainer bar is intermediate the bottom mold portion and the top mold portion.

2. The book molding system of claim 1, wherein the core retainer bar has a proximal end and a distal end, wherein the proximal end is attached to the hinge mechanism, and wherein the distal end extends beyond a front surface of the bottom mold portion.

3. The book molding system of claim 1, wherein the core retainer bar has at least one side oriented at an obtuse angle.

4. The book molding system of claim 1, wherein the core retainer bar has at least one side oriented at an angle of about 110 degrees with respect to a lower surface of the core retainer bar.

5. The book molding system of claim 3, wherein the at least one side of the core retainer bar has an upper side portion and a lower side portion, wherein the upper side portion is oriented at an obtuse angle with respect to an upper surface of the core retainer bar, and wherein the lower side portion is oriented at an obtuse angle with respect to a lower surface of the core retainer bar.

6. The book molding system of claim 1, wherein the hinge mechanism comprises a lower hinge leaf, an upper hinge leaf and a pivot pin.

7. The book molding system of claim 6, wherein the bottom mold portion has a length of between about 12 inches and 36 inches and wherein the hinge mechanism has a pivot axis that is offset from a back surface of the bottom mold portion at least one inch.

8. The book molding system of claim 1, and further comprising a cushion system formed in at least one of the bottom mold portion and the top mold portion, with the cushion system including a resilient mechanism.

9. The book molding system of claim 1, and further comprising a locking mechanism including a pivotable locking arm that maintains the bottom mold portion and the top mold portion in a closed configuration.

10. The book molding system of claim 1, and further comprising a distribution plate pivotally attached to the hinge mechanism.

11. The book molding system of claim 1, and further comprising a handle attached to at least one of the bottom mold portion and the top mold portion.

12. A book molding system comprising:
   a bottom mold portion;
   a top mold portion, wherein at least one of the bottom mold portion and the top mold portion having a molding recess formed therein;
   a core retainer bar;
   a hinge mechanism pivotally attaching the bottom mold portion, the top mold portion and the core retainer bar so that the core retainer bar is intermediate the bottom mold portion and the top mold portion; and
   a cushion system formed in at least one of the bottom mold portion and the top mold portion.

13. The book molding system of claim 12, wherein the core retainer bar has a proximal end and a distal end, wherein the proximal end is attached to the hinge mechanism, and wherein the distal end extends beyond a front surface of the bottom mold portion.

14. The book molding system of claim 12, wherein the core retainer bar has at least one side oriented at an obtuse angle.

15. The book molding system of claim 12, wherein the core retainer bar has at least one side oriented at an angle of about 110 degrees with respect to a lower surface of the core retainer bar.

16. The book molding system of claim 14, wherein the at least one side of the core retainer bar has an upper side portion and a lower side portion, wherein the upper side portion is oriented at an obtuse angle with respect to an upper surface of the core retainer bar, and wherein the lower side portion is oriented at an obtuse angle with respect to a lower surface of the core retainer bar.

17. The book molding system of claim 12, wherein the hinge mechanism comprises a lower hinge leaf, an upper hinge leaf and a pivot pin.

18. The book molding system of claim 17, wherein the bottom mold portion has a length of between about 12 inches and 36 inches and wherein the hinge mechanism has a pivot axis that is offset from a back surface of the bottom mold portion at least one inch.

19. The book molding system of claim 12, and further comprising a locking mechanism including a pivotable locking arm that maintains the bottom mold portion and the top mold portion in a closed configuration.

20. The book molding system of claim 12, and further comprising a distribution plate pivotally attached to the hinge mechanism.

21. The book molding system of claim 12, and further comprising a handle attached to at least one of the bottom mold portion and the top mold portion.

22. A book molding system comprising:
   a bottom mold portion;
   a top mold portion, wherein at least one of the bottom mold portion and the top mold portion having a molding recess formed therein;
   a core retainer bar;
   a hinge mechanism pivotally attaching the bottom mold portion, the top mold portion and the core retainer bar so that the core retainer bar is intermediate the bottom mold portion and the top mold portion; and
   a locking mechanism that maintains the bottom mold portion and the top mold portion in a closed configuration.

23. The book molding system of claim 22, wherein the core retainer bar has a proximal end and a distal end, wherein the proximal end is attached to the hinge mechanism, and wherein the distal end extends beyond a front surface of the bottom mold portion.

24. The book molding system of claim 22, wherein the core retainer bar has at least one side oriented at an obtuse angle.

25. The book molding system of claim 22, wherein the core retainer bar has at least one side oriented at an angle of about 110 degrees with respect to a lower surface of the core retainer bar.

26. The book molding system of claim 24, wherein the at least one side of the core retainer bar has an upper side portion and a lower side portion, wherein the upper side portion is oriented at an obtuse angle with respect to an upper surface of the core retainer bar, and wherein the lower side portion is oriented at an obtuse angle with respect to a lower surface of the core retainer bar.

27. The book molding system of claim 22, wherein the hinge mechanism comprises a lower hinge leaf, an upper hinge leaf and a pivot pin.

28. The book molding system of claim 27, wherein the bottom mold portion has a length of between about 12 inches and 36 inches and wherein the hinge mechanism has a pivot axis that is offset from a back surface of the bottom mold portion at least one inch.

29. The book molding system of claim 22, and further comprising a cushion system formed in at least one of the bottom mold portion and the top mold portion.

30. The book molding system of claim 29, wherein the cushion system comprises a resilient mechanism.

31. The book molding system of claim 22, and further comprising a distribution plate pivotally attached to the hinge mechanism.

32. The book molding system of claim 22, and further comprising a handle attached to at least one of the bottom mold portion and the top mold portion.

* * * * *